Jan. 10, 1961 L. M. KEIGHLEY 2,967,409
ICE HARVESTING ARRANGEMENT
Filed Sept. 8, 1959 4 Sheets-Sheet 1

Lloyd M. Keighley.

Jan. 10, 1961 L. M. KEIGHLEY 2,967,409
ICE HARVESTING ARRANGEMENT
Filed Sept. 8, 1959 4 Sheets-Sheet 2
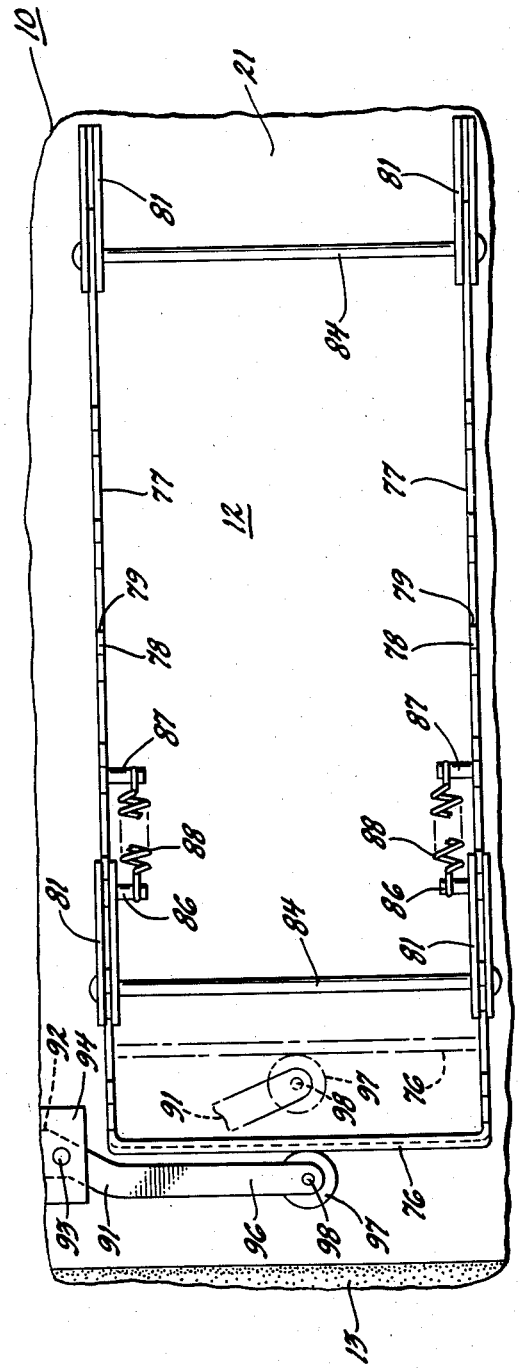
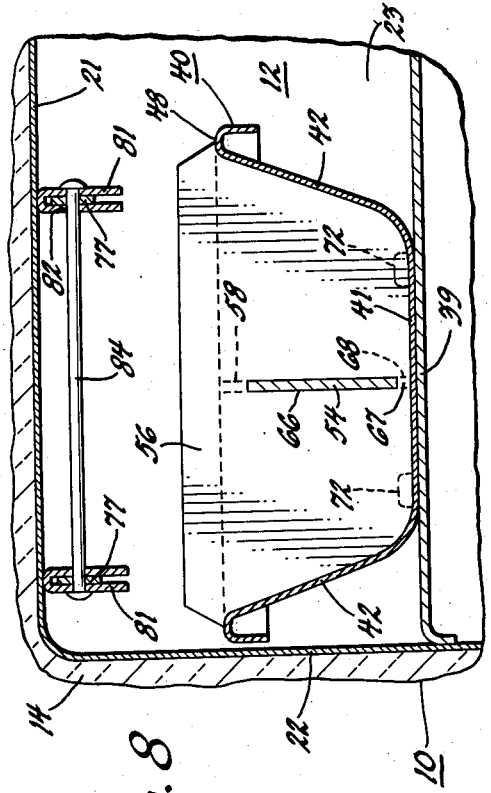
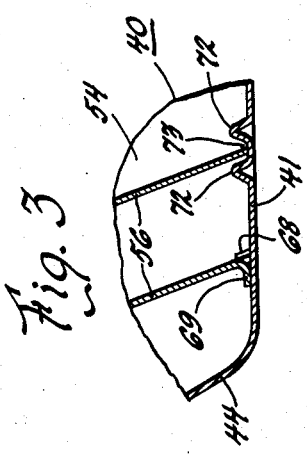
Lloyd M. Keighley.

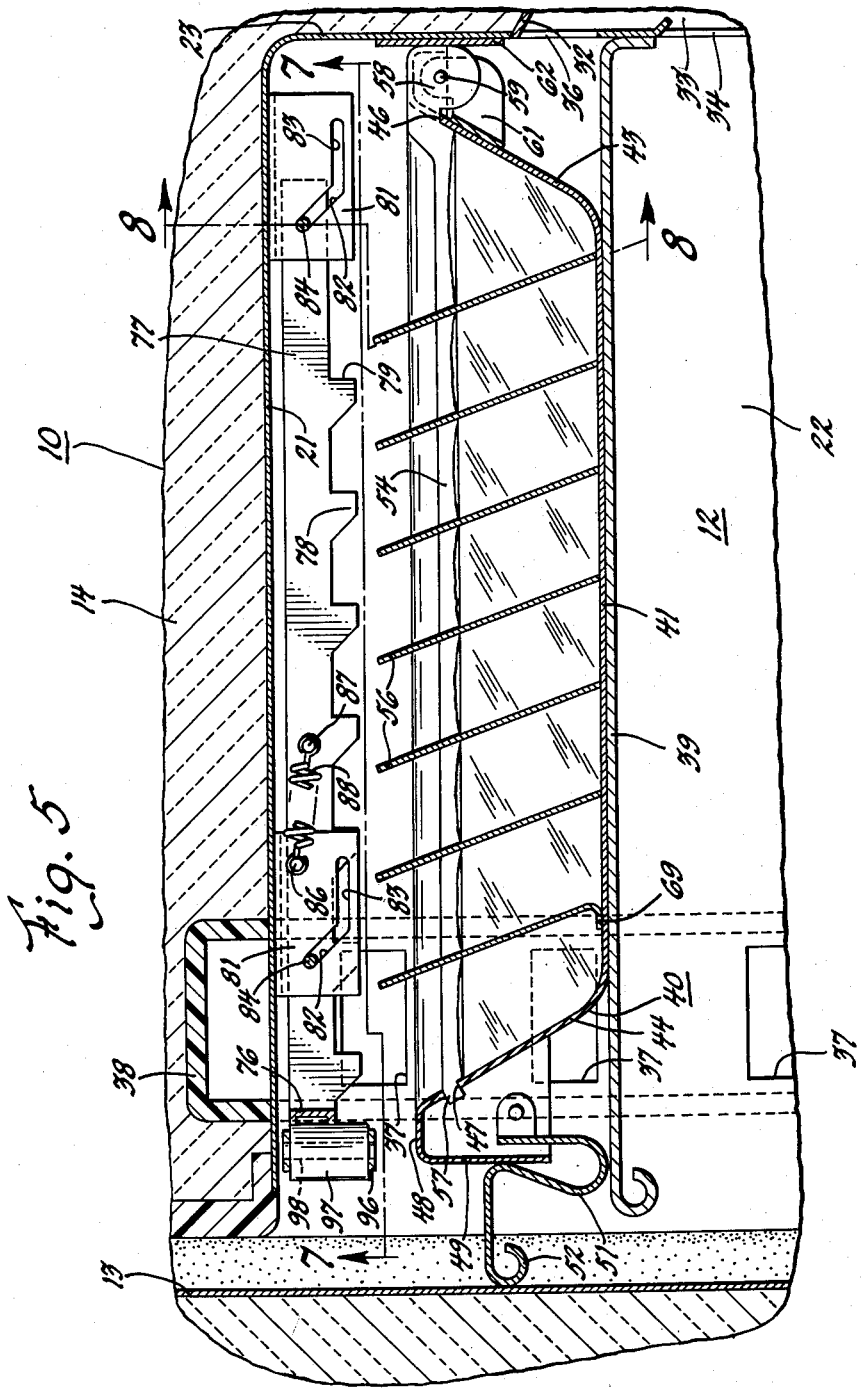

Jan. 10, 1961 L. M. KEIGHLEY 2,967,409
ICE HARVESTING ARRANGEMENT
Filed Sept. 8, 1959 4 Sheets-Sheet 4
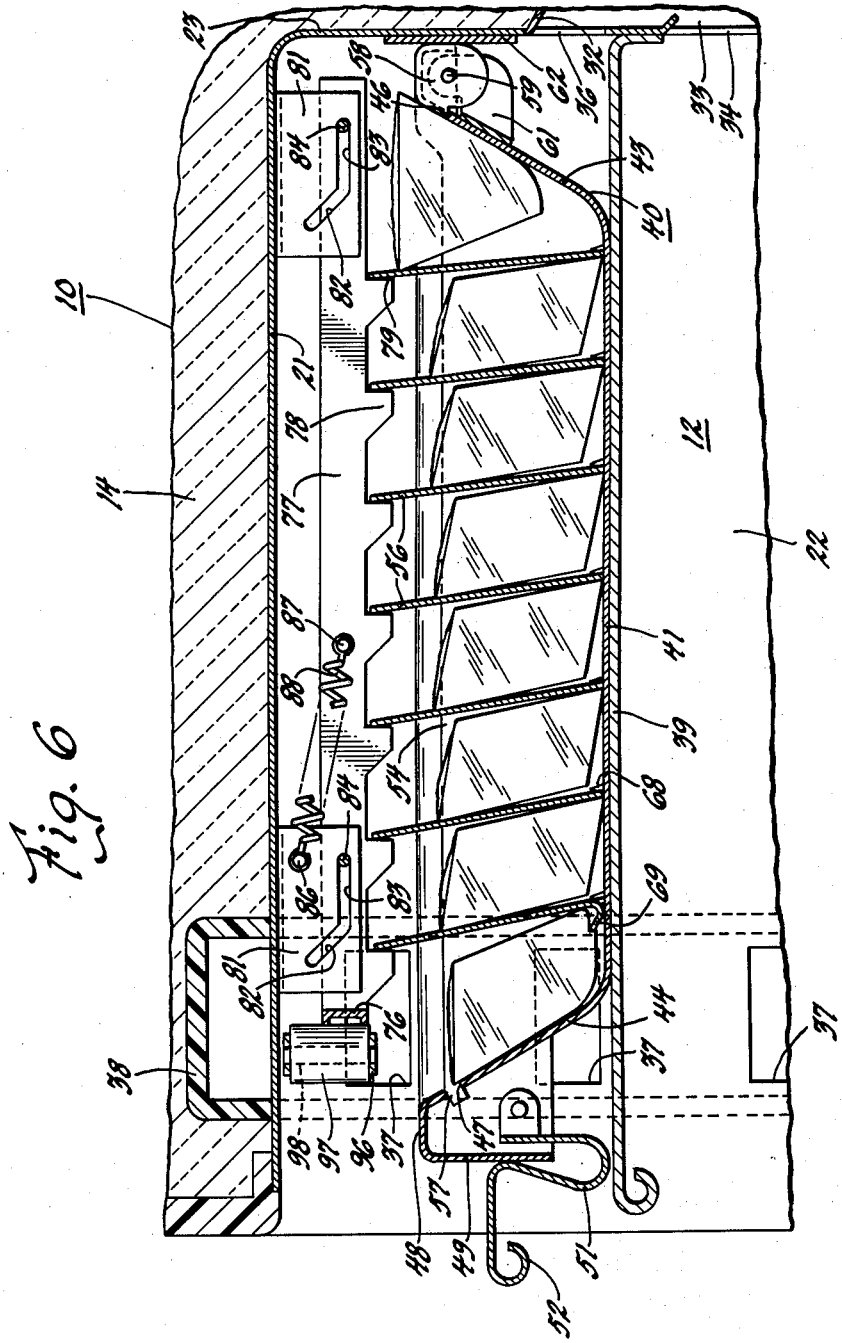
Lloyd M. Keighley.

United States Patent Office 2,967,409
Patented Jan. 10, 1961

2,967,409
ICE HARVESTING ARRANGEMENT
Lloyd M. Keighley, Kettering, Ohio, assignor to General Motors Corporation, Detroit, Mich., a corporation of Delaware Filed Sept. 8, 1959, Ser. No. 838,592
5 Claims. (Cl. 62—353)

This invention relates to refrigeration and particularly to the harvesting of ice blocks from freezing devices employed in household refrigerators.

Ice block ejector devices or mechanisms associated with household refrigerators recently placed on the market require a user of the refrigerator to remove a tray and grid type freezing device containing ice blocks from a freezing chamber therein and to then rotate the freezing device into an inverted supported position on a support of the ice ejector prior to releasing ice blocks from the freezing device. Many users of these refrigerators have objected to this method of releasing ice blocks because there are too many transfers of a freezing device requiring too much handling of such a cold device before the ice blocks can be harvested. In order to overcome this objection and to facilitate an operation of harvesting ice blocks from a household refrigerator, I propose to provide a unitary tray and grid type freezing device wherein ice blocks frozen therein in a freezing chamber of a refrigerator cabinet are loosened from the grid walls and from walls of the tray without moving the device and while the same is supported in an upright position on a support therefor in the chamber whereby the loosened ice blocks are readied for harvest immediately upon removing the freezing device from the chamber.

An object of my invention is to provide an improved method of and arrangement for conveniently and quickly harvesting ice blocks from a freezing device within which they are frozen in a low temperature chamber of a household refrigerator cabinet.

Another object of my invention is to provide means associated with a freezing device support in a freezing chamber of a refrigerator cabinet which is operable while a unitary freezing device is supported in an upright position on the support to loosen ice blocks from grid walls and from walls of a tray of the device whereby the pre-loosened ice blocks are discharged from the freezing device upon removal thereof from the chamber by the act of inverting the device.

A further object of my invention is to associate a manually operable mechanism with a support within a freezing chamber of a refrigerator cabinet which mechanism includes a member or means shiftable thereby to engage and tilt grid walls in a tray of a unitary freezing device while same is supported in an upright position on the support and prior to removing the device from the chamber for loosening ice blocks in their compartments of the tray whereby the loosened ice blocks will freely fall out of the freezing device upon removing it from the chamber and rotating same into an inverted position.

In carrying out the foregoing objects, it is a still further and more specific object of my invention to provide a manually operable mechanism which is separate from and independent of or unattached to a unitary freezing device supported within a freezing chamber of a refrigerator cabinet with a member normally out of contact with the device and movable to engage and tilt grid walls therein for loosening ice blocks therefrom which member is thereafter shifted back to its normal operable position automatically in response to tilting of the walls.

Further objects and advantages of the present invention will be apparent from the following description, reference being had to the accompanying drawings wherein a preferred embodiment of the present invention is clearly shown.

In the drawings:

Figure 3 is a fragmentary sectional view taken on the line 3—3 of Figure 2 showing opposed embossations in the bottom wall of the tray of the freezing device;

Figure 5 is an enlarged fragmentary sectional view taken on the line 5—5 of Figure 1 showing an ice block loosening mechanism in the freezing chamber of the refrigerator associated with a freezing device therein and constructed in accordance with my invention;

Figure 6 is a view similar to Figure 5 with the ice block loosening mechanism in its operated position;

Figure 7 is a fragmentary horizontal sectional view taken on the line 7—7 of Figure 5 showing elements of the ice block loosening mechanism; and Figure 8 is a fragmentary vertical sectional view taken on the line 8—8 of Figure 5 further illustrating the association of a freezing device with the ice block loosening mechanism.

Figure 4:
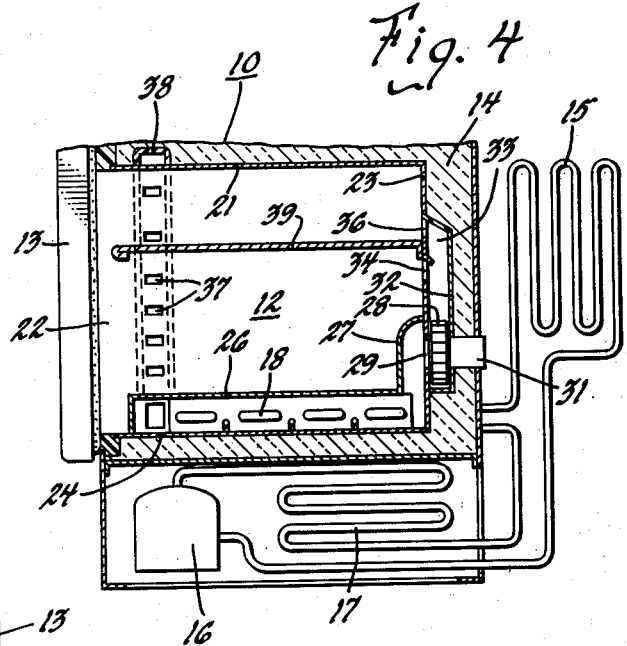
Figure 4 is an enlarged fragmentary sectional view taken on the line 4—4 of Figure 1 showing a refrigerating system diagrammatically associated with the refrigerator cabinet.
Figure 1:
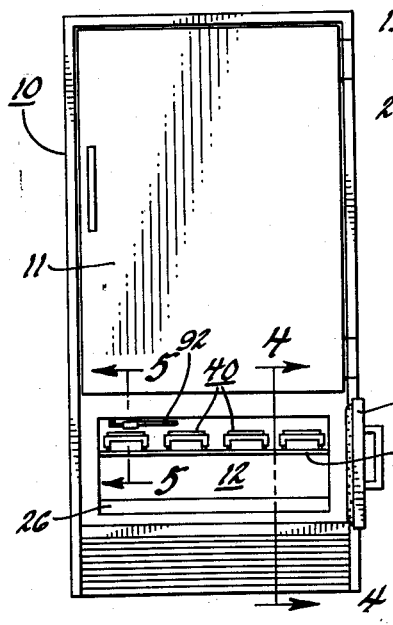
Figure 1 is a front view of a multiple-chambered household refrigerator with its freezing chamber door opened showing freezing devices therein, one of which is associated with an ice block releasing mechanism of the present invention.

Referring to the drawings, for illustrating my invention, I show in Figure 1 thereof a multiple-chambered refrigerator cabinet 10 having walls defining an upper unfrozen food storage chamber (not shown), normally closed by an insulated door 11, and a lower freezing or frozen food storage chamber 12, insulated from the upper chamber, with its insulated door 13 in open position. Insulation 14 within walls of cabinet 10 (see Figure 4) may be of any suitable or conventional material. The upper chamber in cabinet 10 is cooled to a temperature above freezing, such, for example, as between 37° and 43° F., preferably by a plate-like sheet metal evaporator, diagrammatically illustrated by the reference numeral 15 in Figure 4, of a closed refrigerating system associated with the refrigerator. This refrigerating system also includes a sealed motor-compressor unit 16, a condenser 17 and another evaporator 18 all connected to one another by suitable pipes or conduits as is conventional in the art. Lower chamber 12 of cabinet 10 is cooled to a temperature well below 32° F., and preferably between 0° and 10° F., by the evaporator 18 of the refrigerating system for freezing foods, storing frozen food and/or for freezing water in freezing devices into ice blocks for table use in chilling salads or the like and drinks in glasses. Chamber 12, beneath the upper food chamber closed by door 11, includes a box-like liner having integral top, side and rear walls 21, 22 and 23, respectively, and a bottom wall 24. This bottom wall 24 supports the finned evaporator 18 and a sheathed electric heater incorporated therein. Evaporator 18 supports a false bottom 26 provided with an integral upright rear portion 27 forming an air inlet shroud for a fan or blower 28 located behind an aperture 29 in wall 23. Fan or blower 28 is directly connected to and driven by an electric motor 31 located outside chamber 12. The inlet shroud 27 for fan 28 is secured or sealed to rear wall 23 of chamber 12. Fan 28 is surrounded by a wall 32 which is spaced from but joined to rear wall 23 of chamber 12 to provide a discharge passage 33 therebetween communicating at its upper end by way of openings 34 and 36 with the upper interior portion of chamber 12. Air is drawn from chamber 12 through openings 37 in the front portion of the chamber walls 21 and 22, by way of a suitable inverted substantially U-shaped collar-like manifold 38, over evaporator 18 by fan 28 whereby the air is cooled to an extremely low temperature below freezing. Fan 28 discharges the cold air, cooled by evaporator 18, into passage 33 and forces this air therefrom through the openings 34 and 36 into chamber 12 both above and below a rigid metal shelf or support 39 provided therein. The shelf or support 39 together with walls of chamber 12 and cabinet 10 are all parts of a general support insofar as the present invention to be hereinafter described is concerned. The electric heater incorporated in evaporator 18 may be controlled by a timer for periodically heating and defrosting this evaporator as is now conventional in the art to provide a substantially frost free freezing chamber or a below freezing chamber wherein such an arrangement prevents formation of frost on foods, packaged food products, ice trays and other metal parts or elements within chamber 12. Since this arrangement is herein only briefly illustrated and described, I make reference to the copending application S.N. 633,109 of Leonard J. Mann filed January 8, 1957, assigned to the assignee of this application, wherein the arrangement, the refrigerating system, etc., is fully shown and specifically described. It is to be understood that a refrigerating apparatus of the type disclosed in this L. J. Mann application contributes to the making of my present invention entirely feasible as compared to prior refrigerating apparatuses wherein frost accumulation on foods, ice trays, etc., would hinder same.

Figure 2:
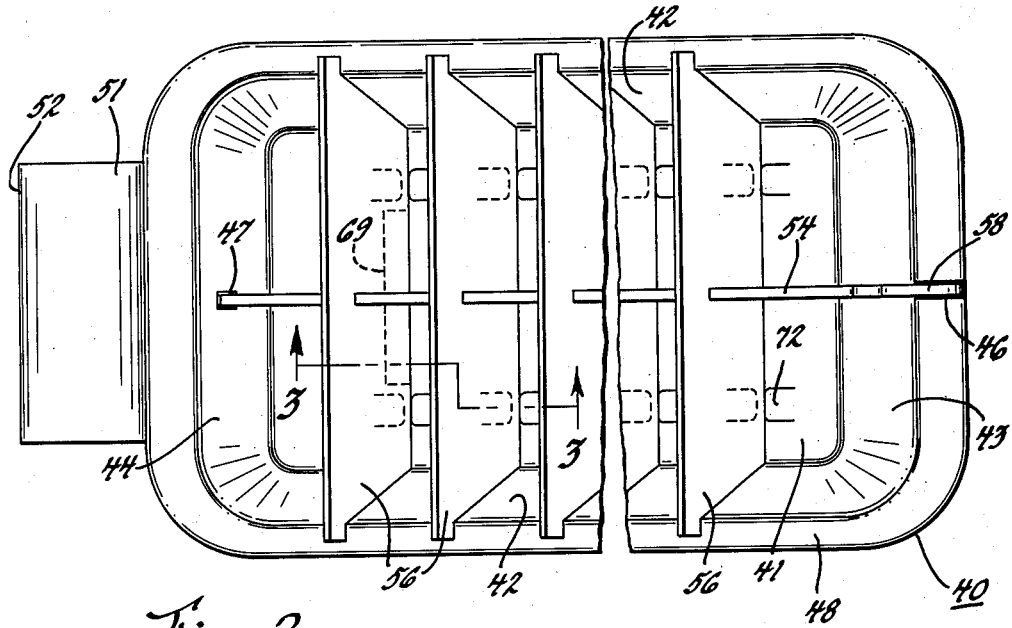
Figure 2 is a top view of a unitary tray and grid type ice block freezing device employed in the present invention.

Shelf 39 is adapted to support, in an upright position thereon, a plurality of side by side unitary freezing devices 40 of the tray and grid type in which water is to be frozen, by the low temperature in chamber 12, into ice blocks. Each of the unitary freezing devices 40 includes an elongated sheet metal pan or tray provided with a bottom 41, outwardly inclined sides 42 and ends 43 and 44 (see Figures 2, 3 and 8). Rear end 43 of the tray is notched out as at 46 and the front end 44 thereof is provided with an opening 47 adjacent a top rim 48 thereon which rim extends around the tray and has an integral depending apron-like portion 49 formed at the forward end thereof. Notch 46 extends through tray rim 48 and downwardly a short distance along end wall 43 for a purpose to be presently described. A cam handle 51 is pivotally mounted upon apron 49 of the tray and is provided with a rounded end portion 52 (see Figure 5). Handle 51 and particularly its end 52 serves a purpose in the present invention which will become apparent hereinafter. A movable or tiltable walled grid structure is locked in the tray against detachment therefrom and in this manner the grid together with the tray form one of the unitary freezing devices 40. The grid structure in a device 40 includes a single one piece metal longitudinal partition 54 and a plurality of substantially inflexible metal walls 56 loosely mounted on partition 54 and extending in spaced apart relation to one another transversely across the partition and the tray so as to be anchored therein for tilting movement relative thereto. An ear 57 on one end of partition 54 fits into the opening 47 in the tray front wall 44, and a raised hook-like projection 58 at the other end of partition 54 fits in notch 46 and overlies the rear end 43 of the tray. A pin or rivet 59 passes through projection 58 and is secured to a portion of a bracket 61 brazed to end wall 43 of the tray. This locks the grid within the tray against detachment therefrom, and the projection 58 provides a rigid part at the rear of the tray adapted to abut a reinforcing plate or strip 62 suitably secured to the back wall 23 of chamber 12 (see Figure 5). Partition 54 and the grid cross walls 56 divide the interior of the tray into unobstructed open top compartments in which water placed in the tray is frozen into separated ice blocks. Cross or transverse grid walls 56 are normally disposed or lie in an acute inclined angular plane with respect to the vertical and are adapted to be tilted toward the vertical for enlarging the compartments intermediate walls 56 and for loosening ice blocks from the grid walls and from walls of the tray as and in a manner to be hereinafter described. It will be noted that the top edge of grid walls 56 extend above the top of tray rim 48 and, consequently, above ice blocks formed in compartments of the tray. Each grid cross wall 56 has a vertically elongated opening 66 therein (see Figure 8) which receives the longitudinal partition 54 with a web portion 67, below opening 66, fitted in a notch 68 of the partition (see Figures 6 and 8). The length of the elongation or opening 66 upwardly determines the normal inclined anchored disposition of walls 56 on partition 54. An outwardly bent integral foot 69 (see Figures 2 and 3) is provided on the one grid cross wall at the front end of the freezing device to aid in loosening the forward ice blocks. In order to align and to at all times maintain cross grid walls 56 in parallel relationship with one another, the bottom wall 41 of the tray of each freezing device 40 is provided with two spaced apart rows of raised opposed embossations 72 (see Figures 2 and 3) forming a groove or socket 73 therebetween which receives the bottom edge portion of walls 56. When force is applied to the upper portion of the grid cross walls 56 in a direction lengthwise of a freezing device 40, to tilt them toward the vertical, these walls pivot in the notches 68 of partition 54 and rock in the sockets 73 provided by the opposed embossations 72.

Having described the construction of ice block forming tray and grid type unitary freezing devices of a preferred character to be used in conjunction with the refrigerator cabinet 10, it is, in accordance with my invention, desirable to provide a means or method of mechanically loosening ice blocks from the grid walls and from walls of the tray of a freezing device 40 prior to removing it from the chamber 12 so as to ready the ice blocks for harvest from a device 40 immediately upon removal thereof. In the present disclosure, this means comprises a manually operable mechanism which is separate from and unattached to a device 40 and includes a grid wall actuating member within chamber 12. The mechanism is preferably out of contact with a freezing device 40 so as to permit any one of the freezing devices in chamber 12 to be placed or slid into association with the mechanism when it is desired to harvest ice blocks. Referring now to Figures 5, 7 and 8 of the drawings, wherein this mechanism is best shown, I mount a rigid U-shaped metal member thereof in chamber 12 for movement with respect thereto and to a unitary freezing device associated therewith and located on support 39. This U-shaped member has a reinforced bight portion 76 and leg or grid wall tilting portions 77 provided with a plurality of integral depending projections 78 forming spaced apart grid wall engaging shoulders 79. A front pair and a rear pair of brackets 81 are securely fastened as by welding or brazing them to the top wall 21 of chamber 12 and these brackets mount the U-shaped member therein. The brackets 81 are each provided with an elongated opening comprising an inclined portion 82 and a straight horizontal portion 83. A tie rod or pin 84 extends through a suitable hole provided therefor in legs 77 of the U-shaped member and pass through the elongated openings in each pair of brackets 81.

These rods or pins 84 and the walls of portions 82 and 83 of the elongated openings in brackets 81 form cam means for guiding a U-shaped member whereby upon movement shoulders 79 thereon will be lowered and shifted into engagement with the grid walls 56. Shoulders 79 on each leg 77 of the U-shaped member are equally spaced apart and are spaced a greater distance from each other than the spacing between the grid walls 56. This is for the purpose of permitting legs 77 of the U-shaped member to be moved down into the same plane of the top of grid walls 56 without interference thereby so that the one shoulder 79 at the rear end of the U-shaped member will engage and tilt the back grid wall adjacent the back end grid wall. One side of the forward pair of brackets 81 has a stud 86 secured thereto and each leg 77 of the U-shaped member carries a stud 87 thereon (see Figures 5 and 7). A resilient means or spring, such as coil spring 88, is fastened to and stretched between the studs 86 and 87 and this means incorporated in the mechanism will, in addition to maintaining legs 79 of the U-shaped member biased toward the front of chamber 12, also automatically return the pins 84 to the upper end of inclined portion 82 of the openings in brackets 81 after or in response to tilting of the grid walls 56. The spring means 88 normally holds the operable mechanism upwardly of and out of contact with the freezing device therebelow so that any one of the devices 40 on support 39 may be slid laterally thereunder when it is desired to loosen ice blocks therein. I provide means in the operable mechanism for shifting the U-shaped member thereof with respect to chamber 12 and a freezing device 40 below the mechanism and supported in an upright position on support or shelf 39. This shifting means may be of any suitable or desirable form, and I show, for the sake of illustration, a lever 91 (see Figures 1 and 7) having a handle end 92, a mid portion pivotally mounted by a pin 93 upon a bracket 94 secured to top wall 21 of chamber 12 and an end 96 having a roller 97 anchored thereto by a pin 98.

Assume that water contained in the upright tray of the freezing devices 40 supported on support or shelf 39 in chamber 12 is hard-frozen into ice blocks and that it is desired to harvest ice blocks from the freezing device beneath the ice block loosening mechanism. It is to be noted that the inner panel or surface of door 13 of freezing chamber 12 engages end 52 of handle 51 on the freezing device 40 below the operable mechanism to position and hold the rear end of the device in abutment with the chamber back wall or reinforcing plate 62 thereon. Door 13 is now opened to provide access to lever 91 and its handle end 92 is grasped by the hand of an operator and pulled forwardly with respect to chamber 12 to pivot same about pin 93 and to rotate its roller end 96 thereabout. Roller 97 bears against reinforced bight portion 76 of the U-shaped member and shifts this member together with its leg portions 77 rearwardly within chamber 12 a distance indicated by the dot-dash lines in Figure 7 of the drawings and as shown in Figure 6 thereof. The abutment of the rear end of device 40 with plate 62 on wall 23 of chamber 12 holds the tray of the freezing device stationary on shelf or support 39 upon operating the mechanism to shift the U-shaped member thereof lengthwise relative to the freezing device and its support. It is to be understood that the initial shifting of the U-shaped actuating member slides tie rods or pins 84 downwardly within inclined portion 82 of the elongated openings in brackets 81. This initial shifting causes shoulder 79 on the rearmost projection 78 of legs 77 of the actuating member to move down into engagement, at spaced apart points, with the top of the rearmost grid cross wall 56 of freezing device 40. Consequently, all other of the shoulders 79 simultaneously move down into a position at the front of walls 56 but, due to the distance between shoulders 79 being slightly greater than the distance intermediate grid walls 56, do not as yet engage walls 56. Continued shifting of legs 77 of the U-shaped movable member rearwardly with respect to chamber 12 causes tie rods or pins 84 to thereafter slide within the horizontal portion 83 of the elongated openings in brackets 81 to the rear end thereof (see Figure 6). This continued or complete shifting of the manually operable mechanism therefore first tilts the rear inclined grid cross wall 56 toward the vertical, and the other shoulders 79 on the U-shaped member successively engage the remainder of the inclined walls 56 to tilt them one after the other from the rear end to the front end of device 40 toward the vertical within the tray thereof, while the device is supported in its upright position on support 39, to thereby progressively break the frozen bond between ice blocks, grid walls and walls of the tray of the freezing device. In this manner, all the ice blocks are loosened from their compartment walls while being retained in the tray of freezing device 40. The operator then releases lever 91, and the spring means 88, further tensioned by shifting of the U-shaped member, is rendered effective in response to the release of lever 91 for returning elements of the mechanism to their normal position upwardly of and out of contact with the freezing device. At this time, the loosened ice blocks may remain cocked or wedged angularly within their compartments as shown in Figure 6 ready to be dumped out of the unitary freezing device. The loosened ice blocks together with walls 56 may slip back into their normal position within freezing device 40. However since the ice blocks are loosened without any appreciable increase in temperature thereof or of the freezing device, they stay hard-frozen and will not rebond to the compartment walls and, consequently, are readied for harvest at any time. The operator now grasps handle 51 of freezing device 40 and pulls forwardly thereon to remove the device from chamber 12 and then rotates the device 40 into an inverted position over an ice bucket, receptacle or the like whereupon the preloosened ice blocks gravitationally fall out of the compartments of the unitary freezing device. If there is a tendency of the preloosened ice blocks to hang or stick in end compartments as the unitary freezing device 40 is inverted, a slight shaking or jerking of the device will cause the ice blocks to be released from or tumble out of the inverted device. Thus, my invention is distinguished from prior methods or arrangements of harvesting ice blocks in that the feature of gravitationally releasing preloosened ice blocks from a unitary freezing device by the act of inverting the device saves considerable time in an ice block harvesting operation and requires less maneuvering of the cold device by hands of an operator. In case a greater quantity of ice blocks, than those harvested from the one freezing device, as just described, are desired, and adjacent freezing device 40 on support 39 in chamber 12 may be slid sidewise along this support, against the chamber upright side wall 22, to position same under in vertical alignment with the manually operable mechanism and the ice harvesting operation repeated.

It should, from the foregoing, be apparent that I have provided an improved method of and arrangement for harvesting ice blocks from freezing devices of the unitary tray and grid type employed in household refrigerator cabinets. By loosening ice blocks in a freezing device while the device is supported in an upright position on a support within a freezing chamber to render them immediately available upon removing the device from the chamber, this considerably lessens the amount of handling, transference and other motions or acts previously required of a housewife in an ice block harvesting operation. My idea is unique and is to be distinguished from former arrangements wherein it was necessary to remove a grid from a tray before the ice blocks could be harvested from the tray or of removing a freezing device from a freezing chamber and repositioning the device in an inverted supported position on an ice block ejector device in the chamber or outside thereof.

The present improvement is particularly adapted for use in present day refrigerators having a freezing chamber which is maintained substantially free of frost accumulations on walls of the chamber, on packaged foods therein and/or on other devices or mechanisms desired to be incorporated within such chamber. The mechanism herein disclosed is feasible, operable at all times and while unattached to freezing devices employed in a refrigerator, it is an inseparable part of the cabinet thereof. My invention accomplishes or produces a long sought for and highly desirable result in the art of harvesting ice blocks from household refrigerators.

While the embodiment of the present invention as herein disclosed, constitutes a preferred form, it is to be understood that other forms might be adopted.

What is claimed is as follows:

1. In combination, a refrigerator cabinet provided with a chamber therein, a refrigerating system associated with said cabinet including a refrigerant evaporator for cooling said chamber to a temperature below 32° F., a freezing device removably disposed in an upright position on a support within said chamber, said freezing device including an elongated tray and a grid structure locked therein against detachment therefrom having spaced apart substantially inflexible walls anchored for tilting movement relative to said tray, said freezing device being adapted to contain liquid and said grid walls dividing the interior of said tray into a plurality of compartments in which the liquid is to be frozen into ice blocks, a grid wall tilting mechanism separate from and having all parts thereof unattached to said freezing device, said mechanism comprising a member movably mounted in said chamber above said freezing device normally out of contact therewith and an operable means for moving said member, said operable means upon being operated shifting said member downwardly and longitudinally along said freezing device into engagement with walls of said grid structure for applying force thereto in a lengthwise direction only with respect to said elongated tray while the device is supported in said upright position within said chamber, means for holding the tray of said freezing device stationary on said support during operation of said operable means to cause the force applied to said grid walls to tilt them within said tray and loosen the ice blocks from said grid structure and from walls of the tray solely by tilting the grid walls, and said grid and tray together with the preloosened ice blocks therein being removable from said support as a unit and rotatable outside said chamber into a substantially inverted position for releasing the ice blocks from said device while said grid structure remains locked in said tray.

2. In combination, a refrigerator cabinet provided with a chamber therein, a refrigerating system associated with said cabinet including a refrigerant evaporator for cooling said chamber to a temperature below 32° F., a freezing device removably disposed in an upright position on a support within said chamber, said freezing device including an elongated tray and a grid structure locked therein against detachment therefrom having spaced apart substantially inflexible walls anchored for tilting movement relative to said tray, said freezing device being adapted to contain liquid and said grid walls dividing the interior of said tray into a plurality of compartments in which the liquid is to be frozen into ice blocks, a grid wall tilting mechanism separate from and having all parts thereof unattached to said freezing device, said mechanism comprising a member movably mounted in said chamber above said freezing device normally out of contact therewith and a manually operable actuator for moving said movable member, said actuator upon being manually actuated shifting said member downwardly and thence longitudinally along said freezing device into engagement with the top portion of walls of said grid structure for applying force thereto in a lengthwise direction only with respect to said elongated tray while the device is supported in said upright position within said chamber, means for holding the tray of said freezing device stationary on said support during the manual actuation of said actuator to cause the force applied to said grid walls to tilt them within said tray and loosen the ice blocks from said grid structure and from walls of the tray solely by tilting the grid walls, said grid and tray together with the preloosened ice blocks therein being removable from said support as a unit and rotatable outside said chamber into a substantially inverted position, and the preloosened ice blocks being gravitationally released from said device by the act of inverting said unit while said grid remains locked in said tray.

3. In combination, a refrigerator cabinet provided with a chamber therein, a refrigerating system associated with said cabinet including a refrigerant evaporator for cooling said chamber to a temperature below 32° F., a freezing device removably disposed in an upright position on a support within said chamber, said freezing device including an elongated tray and a grid structure locked therein against detachment therefrom having spaced apart substantially inflexible walls anchored for tilting movement relative to said tray, said freezing device being adapted to contain liquid and said grid walls dividing the interior of said tray into a plurality of compartments in which the liquid is to be frozen into ice blocks, a grid wall tilting mechanism separate from and having all parts thereof unattached to said freezing device, said mechanism comprising a U-shaped member movably mounted in said chamber above said freezing device normally out of contact therewith and an operable means for moving said member, the legs of said U-shaped member extending along said device, said operable means upon being operated engaging the bight portion of said U-shaped member and shifting same downwardly thence longitudinally along said freezing device whereby portions of said legs of the member engage walls of said grid structure at spaced apart points therealong for applying force thereto in a lengthwise direction only with respect to said elongated tray while the device is supported in said upright position within said chamber, means for holding the tray of said freezing device stationary on said support during operation of said operable means to cause the force applied to said grid walls to tilt them within said tray and loosen the ice blocks from said grid structure and from walls of the tray solely by tilting the grid walls, and said grid and tray together with the preloosened ice blocks therein being removable from said support as a unit and rotatable outside said chamber into a substantially inverted position for releasing the ice blocks from said device while said grid structure remains locked in said tray.

4. In combination, a support, a freezing device disposed in an upright position on said support, said freezing device including an elongated tray and a grid structure locked therein against detachment therefrom having spaced apart substantially inflexible walls anchored for tilting movement relative to said tray, said freezing device being adapted to contain liquid and said grid walls dividing the interior of said tray into a plurality of compartments in which the liquid is to be frozen into ice blocks, a grid wall tilting mechanism separate from and having all parts thereof unattached to said freezing device, said mechanism comprising a member movably mounted above said freezing device normally out of contact therewith and an operable means for moving said member, said operable means upon being operated shifting said member longitudinally along said freezing device into engagement with walls of said grid structure for applying force thereto in a lengthwise direction only with respect to said elongated tray while the device is supported in said upright position on said support, means for holding the tray of said freezing device stationary on said support during operation of said operable means to cause the force applied to said grid walls to tilt them within said tray and loosen the ice blocks from said grid structure and from walls of the tray solely in response to the tilting of the grid walls, and said grid and tray together with the pre-loosened ice blocks therein being removable from said support and rotatable as a unit into a substantially inverted position for releasing the ice blocks from said device while said grid structure remains locked in said tray.

5. In combination, a refrigeration provided with a chamber therein having an access opening, a door on said refrigerator for closing the chamber access opening, a refrigerating system associated with said refrigerator including a refrigerant evaporator cooling said chamber to a temperature below 32° F., a unitary freezing device supported in an upright position on a support provided therefor within said chamber, said freezing device comprising an elongated tray and a grid structure including a plurality of spaced apart walls locked in said tray against detachment therefrom and anchored therein for tilting movement with respect thereto, said grid walls dividing the interior of said tray into compartments in which water placed therein is frozen into separated ice blocks within said chamber, a grid wall tilting mechanism separate from and having all parts thereof unattached to said freezing device, said mechanism comprising a member movably mounted in said chamber out of contact with said freezing device and a manually operable means for moving said member, a portion of said refrigerator door when same is closed engaging one end of said freezing device and holding the other end thereof in abutment with a rigid means in said chamber associated with said support, said manually operable means being, after opening said door, operated to shift said member into engagement with said grid walls for applying force thereto only in a direction lengthwise along said elongated tray while the freezing device is supported in said upright position on said support, the abutment of said other end of said freezing device with said rigid means preventing movement of said tray relative to said support during operation of said operable means of the mechanism whereby the lengthwise force applied to said grid walls tilts them in the upright tray and loosens ice blocks from said grid walls and from said tray, and said unitary freezing device thereafter being removable from said support and rotatable outside said chamber into a substantially inverted position to release the loosened ice blocks from said tray while said grid structure remains locked therein.

References Cited in the file of this patent

UNITED STATES PATENTS

| | | |
|---|---|---|
| 2,063,208 | Tweedale | Dec. 8, 1936 |
| 2,093,856 | Wales | Sept. 21, 1937 |
| 2,217,681 | Jennings | Oct. 15, 1940 |
| 2,364,559 | Storer | Dec. 5, 1944 |
| 2,403,846 | Carney | July 9, 1946 |
| 2,477,286 | Carney | July 26, 1949 |
| 2,882,700 | Marvin | Apr. 21, 1959 |
| 2,917,907 | Moore | Dec. 22, 1959 |